(No Model.)
H. KUNATH.
BALL BEARING.
No. 401,748. Patented Apr. 23, 1889.
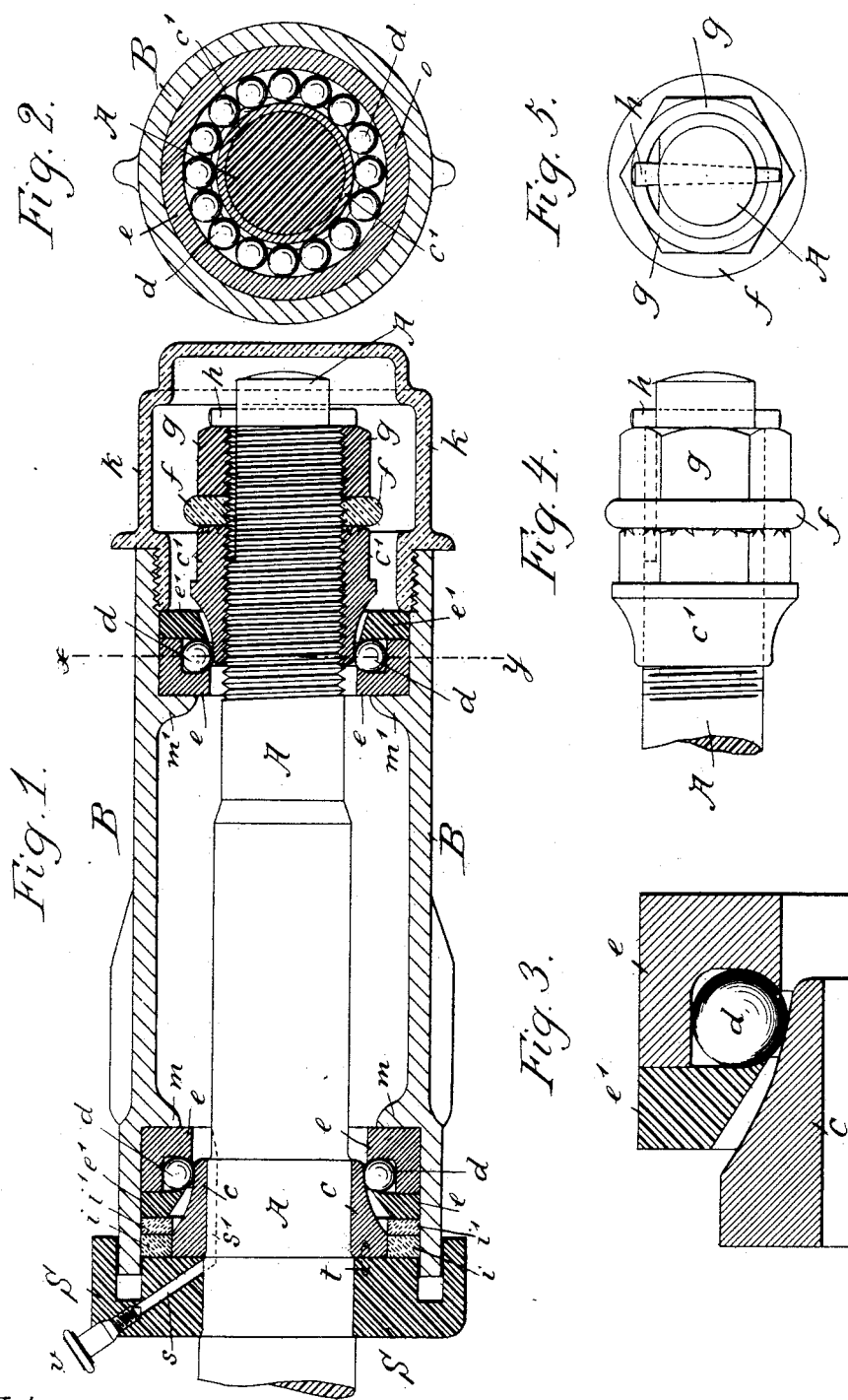

UNITED STATES PATENT OFFICE.

HERMANN KUNATH, OF DRESDEN, SAXONY, GERMANY.

BALL-BEARING.

SPECIFICATION forming part of Letters Patent No. 401,748, dated April 23, 1889.

Application filed December 17, 1888. Serial No. 293,873. (No model.)

*To all whom it may concern:*

Be it known that I, HERMANN KUNATH, a subject of the King of Saxony, and residing at Dresden, in the Kingdom of Saxony, German Empire, have invented certain new and useful Improvements in Adjustable Ball-Bearings for Carriage-Axles, of which the following is a full and clear description.

My invention relates to adjustable ball-bearings for carriage-axles, and has for its purpose that the axle-box may be removed from the spindle without the balls falling out, and that the cone by which the balls are regulated is prevented from accidentally tightening on the balls and preventing them revolving.

In order to make my invention more clear, I refer to the accompanying sheet of drawings, in which similar letters denote similar parts throughout the different figures.

Figure 1 is a longitudinal section of my improved axle-box. Fig. 2 is a cross-section through the line $x\, y$, Fig. 1. Fig. 3 is a view showing, on a larger scale, the bearing of the balls and the rings for holding them in their place when the box is removed from the end of the axle-spindle. Fig. 4 shows a side view of the manner in which the regulating-cone is held fast. Fig. 5 is an end view of Fig. 4.

A is the spindle, which is screwed at its outer end and has a butting-ring, S, at the inner end. The butting-ring S is provided with an oil-hole, $s$.

B is the axle-box, on which the carriage-wheel is fastened. The axle-spindle A is fitted with the cone $c'$ at the front, which is screwed on, and at the back side with the cone $c$, which abuts against the butting-ring S, and is prevented from turning by the pin $t$.

In the box B are fitted the rings $e\, e'$ at the front and back side and held in their proper positions by the rings $m\, m'$. The rings $e\, e'$ are so formed that they encircle the balls $d$ to a certain extent, as may be seen by reference to Fig. 3. The rings $e$, which carry the balls $d$, are made from hard steel, while the rings $e'$, which hold the balls $d$ in the rings $e$, are made from wrought-iron. The rings hold the balls $d$ in such a manner that when the axle-box is removed from the axle-spindle the balls cannot fall out. The inner end of the axle-spindle is provided with a lubricating-groove, $s'$, and the butting-ring S with the oil-hole $s$, which is closed by the screw $v$. The groove $s'$ extends to the inside of the axle-box B. Between the butting-ring S and the ball-rings $e\, e'$ are fitted leather washers $i\, i'$, which shut the axle-box completely at the back side.

The adjustment and fastening of the outside cone, $c'$, are as follows: The cone $c'$ is screwed onto the front part of the axle-spindle A. The end of the spindle is flattened on one side, as seen in Figs. 4 and 5, and a washer, $f$, fitted over the same. This washer $f$ is made from some soft metal, as brass or bronze. The washer $f$ is prevented from turning by the flat on the end of the spindle, and is pressed against the serrated end of the cone $c'$. In front of the washer $f$ is a lock-nut, $g$, screwed on the end of the spindle, which presses the soft washer $f$ against the serrated end of the cone $c$ and prevents the same from accidentally turning. The spindle A is fitted with a linchpin, $h$, in front of the lock-nut $g$, in order to prevent the nut $g$ from coming off. The end of the spindle is protected by the cap $k$, which screws into the axle-box B.

The bearings may be easily adjusted by removing the cap $k$ and loosening the nut $g$ and washer $f$, when the cone may be adjusted at pleasure by a wrench, (the end of the cone is provided with squares for this purpose,) and the washer $f$ and nut $g$ again tightened up.

Having described my invention, what I desire to claim and protect by Letters Patent in the United States is—

1. In adjustable ball-bearings for carriage-axles, the combination of the rings $e\, e'\, e\, e'$, cones $c\, c'$, axle-spindle A, washer $f$, lock-nut $g$, and box B, with cap $k$, substantially and for the purpose as described.

2. In adjustable ball-bearings for carriage-axles, the combination of the spindle A, butting-ring S, cones $c\, c'$, rings $e\, e'\, e\, e'$, leather washers $i\, i'$, soft-metal washer $f$, lock-nut $g$, balls $d$, axle-box B, and cap $k$, substantially and for the purpose as described.

In witness whereof I have hereunto set my hand in presence of two witnesses.

HERMANN KUNATH.

Witnesses:
 ROBERT LOEBSCHER,
 ADOLPH MÜLLER.